May 1, 1962  W. B. GOODENOW ETAL  3,032,271
APPARATUS FOR DETERMINATION OF SEISMIC DATA CORRECTIONS
Filed July 22, 1957  3 Sheets-Sheet 1

INVENTORS
WAYNE B. GOODENOW
BILL SMITH
RICHARD W. YOUNG
BY Floyd Trimble
ATTORNEY

INVENTORS
WAYNE B. GOODENOW
BILL SMITH
RICHARD W. YOUNG

BY *Floyd Trimble*

ATTORNEY

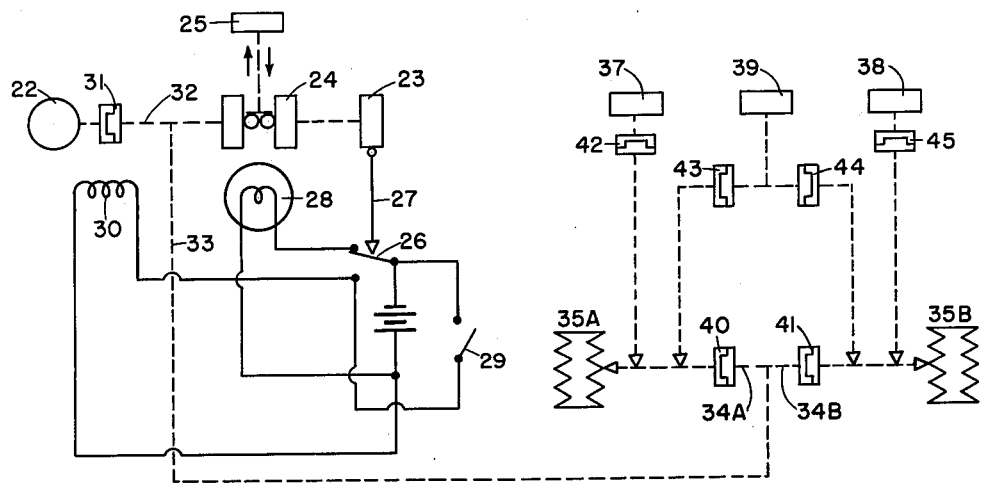
FIG. 4
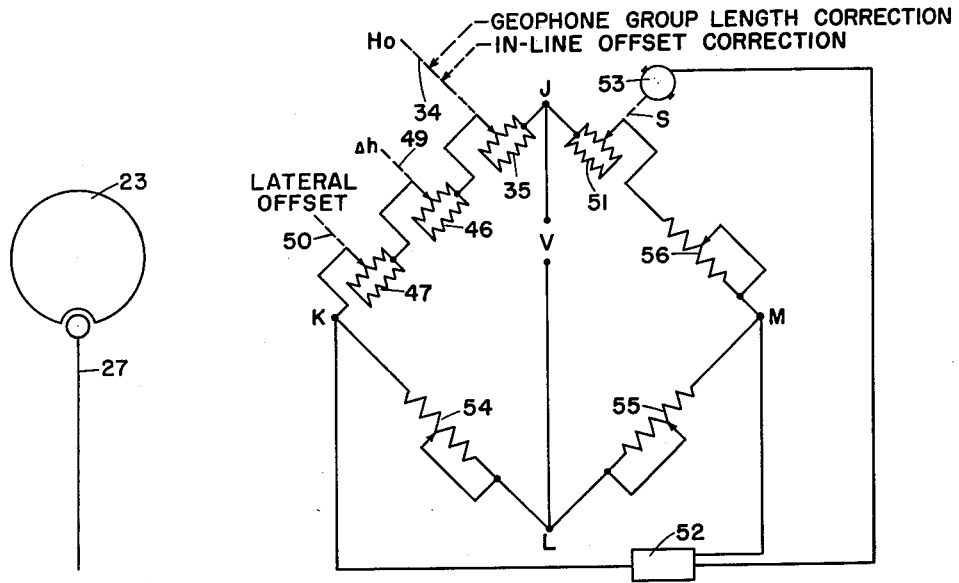
FIG. 5
FIG. 6
INVENTOR.
WAYNE B. GOODENOW
BILL SMITH
RICHARD W. YOUNG
BY Floyd Trimble
ATTORNEY

United States Patent Office 3,032,271
Patented May 1, 1962

3,032,271
APPARATUS FOR DETERMINATION OF SEISMIC DATA CORRECTIONS

Wayne B. Goodenow, Bill Smith, and Richard W. Young, Ponca City, Okla., assignors to Continental Oil Company, Ponca City, Okla., a corporation of Delaware
Filed July 22, 1957, Ser. No. 673,452
8 Claims. (Cl. 235—193)

Our invention relates to the art of geophysical prospecting and more particularly to apparatus to be used in the art of seismic prospecting wherein it is desired to conduct a continuous profile survey of geological conditions beneath the surface of the earth.

In a more specific sense the invention comprises an apparatus designed to determine the weathered layer and elevation corrections to be applied to seismic data.

In normal seismic survey procedure a charge of explosive is detonated below the surface of the earth. The explosion generates vibrations in the earth, commonly referred to as seismic energy. This energy travels in all directions from the point of origin. The first energy to reach any specific point will be that which travelled by the shortest time path from the origin to the specific point. Energy which travels in a downward direction will pass through several different materials in the earth, many of which have different velocity characteristics. When the downward travelling energy encounters a change in velocity, commonly called a reflecting horizon or interface in the industry, a portion of the energy will be reflected back toward the surface. Such energy which returns to the surface is described as a reflection.

It is normal in the industry to place a plurality of geophones or geophone groups in a line on the surface in the vicinity of the point of explosion. The point of explosion is commonly called the "shot point," and the distance between the centers of geophone groups on opposite ends of the line is normally called the "spread length." Such a line of geophones is used in conjunction with other seismic recording equipment to make a permanent record of the motion of the earth's surface resulting from an explosion at the shot point. To one skilled in the art such a recording will show the first energy arriving at each geophone or geophone group position, and also the reflected energy from horizons or interfaces deep beneath the surface. A series of recordings may be interpreted to determine, with reasonable accuracy, the depth and the degree and direction of slope of subsurface strata.

Since the elevation of the earth's surface is a variable, a correction must be made to allow for elevation differences.

On the surface of earth there is a layer of material which is normally described as the weathered layer. The velocity of energy travel through the weathered layer is less than the velocity through underlying material. Since the velocity of travel through, and thickness of, the weathered layer, are both variables, corrections must be made for such weathered layer.

It is an object of this invention to provide means for determining corrections to be applied to seismic data to allow for differences in the elevation of the surface of the earth.

It is also an object of this invention to provide means for determining corrections to be applied to seismic data to compensate for effects due to the thickness of the weathered layer at the surface of the earth.

It is also an object of this invention to provide means for simultaneously computing the corrections to be applied to seismic data to compensate for the effects of the weathered layer and for the elevation above a reference plane.

Further objects of this invention will become apparent as the description proceeds, particularly when considered in conjunction with the accompanying drawings. It is to be understood that this description is for the purpose of illustration only and is not intended as a limitation of the invention.

In accordance with a preferred embodiment of the invention, a plurality of input data is supplied to a computing apparatus, wherein the data are resolved into weathering and elevation corrections to be applied to seismic data. These inputs correspond to: in-line horizontal distances from shot points to geophones; lateral offsets of the shot points from the line of geophones; the horizontal velocity of energy travel beneath the weathered layer; first arrival times (times of travel of the first energy reaching each geophone from the explosion); velocity through the weathered layer; vertical distances between the geophone groups and the reference elevation; and the vertical velocity below the weathered layer. The elements of the apparatus perform the necessary resolving, adding, subtracting, multiplying, and dividing operations to compute from the input data the necessary corrections. Another embodiment of the invention includes means to provide the inputs corresponding to the in-line horizontal distances from shot points to geophones.

Referring now to the drawings:

FIGURE 4 is a diagram of a preferred embodiment of the means for producing the representations of in-line horizontal distances.

FIGURE 5 is an end view of the cam shown in FIGURE 4.

FIGURE 6 is a schematic diagram of a preferred embodiment of a triangle solver suitable for use in the invention.

Figure 1:
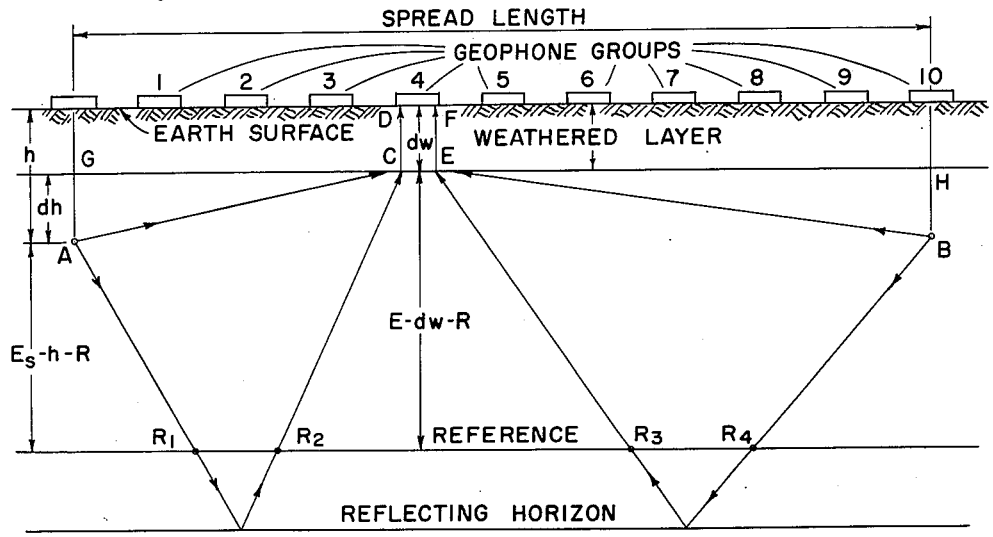
FIGURE 1 is a diagrammatic representation of a typical seismic prospecting setup showing lines representative of reflected energy paths.

FIGURE 1 shows a spread of geophone groups, each group comprising a plurality of geophones. For the sake of convenience only ten groups are shown, although it is customary to use twenty or more groups for each complete setup. Points A and B represent shot points at which the detonation of an explosive takes place. First a charge is exploded at point A and then a second charge is exploded at point B so that a reverse profile may be obtained.

When the charge at point A is detonated, some of the energy travels directly to the geophone group 4 being observed by the shortest time path, assumed to be from A to the weathered layer (at C) and then almost vertically from C through the weathered layer to the first geophone at D. Some of the energy, however, travels from point A to the reflecting surface from which a portion is reflected back to a point approximately at C and then to D. The process is repeated when the shot at point B is detonated. Actually waves are received by each of the geophones of the group; but for the sake of simplicity, only the reception at D and F are described. By analysis of the travel time data for reflected energy arriving at each geophone group, an analysis of the shape of the reflecting surface may be made by methods well known in the art.

It is desired to make data correction for the weathered layer and for the variations in surface elevation so that the corrected data will be the same as though the detonation had occurred at the reference elevation points $R_1$ and $R_4$ and the geophones had been located at reference elevation points $R_2$ and $R_3$. This may be done in the case of shot A by finding the total travel time from A to the reflecting layer and back to the geophones at D, then subtracting the travel time ($Ts$) from A to the reference point $R_1$, subtracting also the travel time ($Te$) from $R_2$ to point C, and finally subtracting the time of travel ($Tw$) through the weathered layer.

The travel time from A to $R_1$ may be readily calculated in the following manner (assuming the line of travel is substantially vertical): (1) determine the distance ($Es$—$h$—R) from A to $R_1$ by simple subtraction of the known quantities $h$ (the depth of the shot hole) and R (the reference elevation) from the known elevation ($Es$) of the surface at the shot point and (2) dividing this distance by the vertical velocity ($Ve$) below the weathered layer. The vertical velocity used is a velocity representative for the area being surveyed, and is determined by a previously conducted velocity survey by methods well known in the art.

The travel time from shot point B to reference point $R_4$ may be calculated in the same manner as the travel time from shot point A to refernce point $R_1$.

Figure 2:
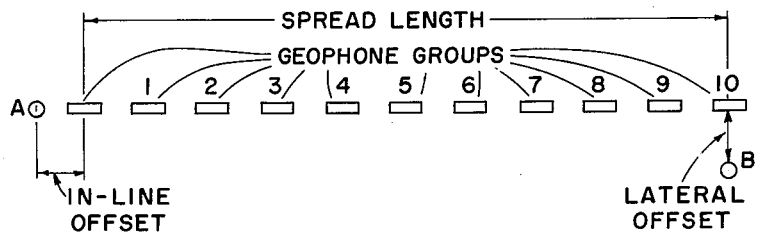
FIGURE 2 is a diagrammatic representation of a view taken from above and looking down upon a prospective setup.

The calculation of the travel time ($Tw$) through the weathered layer at each geophone group may be made in the following manner. In the ordinary case the shot point is in line with the line of geophones; however in some cases the shot point is laterally offset (as shown in FIG. 2). In a case where there is a lateral offset, the true distance GC will have to be determined by solving the right triangle formed by the lateral offset and the in-line component of GC. After determination of the true distance from G to C the distance from A to C may be readily calculated by solving the right triangle formed by AG ($dh$, the vertical distance from base of weathered layer to the explosive charge) and GC. Knowing the distance AC, the travel time ($Th$) from A to C can be readily determined by dividing AC by the horizontal velocity below the weathered layer. The horizontal velocity below the weathered layer will be hereinafter referred to as the refracting velocity ($Vh$). A representative value of this refracting velocity is determined by previously conducted surveys of the area by methods well known in the art. After obtaining the travel time from A to C it is a simple matter to determine $Tw$ by subtracting $Th$ from the first arrival time from A to D.

Similar calculations may be used to determine the travel times from shot point B in order to determine the travel time from E to F. The two travel times (from C to D and from E to F) may then be averaged to determine a value of $Tw$ that is more representative of the travel time through the weathered layer at the mid-way point of each geophone group.

Having a representative value of $Tw$, the travel times from the reference points $R_2$ and $R_3$ up to the base of the weathered layer are determined in the following manner. $Tw$ is multiplied by a previously determined representative value of the velocity ($Vw$) through the weathered layer to give the thickness ($dw$) of the weathered layer at the respective geophone group. Then assuming that the paths of travel from $R_2$ and $R_3$ to the base of the weathered layer are vertical, and therefore equal in length, such length may be determined by subtracting $dw$ and the reference elevation R from the known elevation E at the geophone group. Then this vertical distance may be divided by the vertical velocity ($Ve$) to give ($Te$), the time of travel from the reference elevation to the base of the weathered layer.

Thus the total travel time of energy to any geophone group may be corrected to the reference elevation by application of computed time corrections.

Although these calculations are not difficult, they take considerable time to perform. The purpose of this invention is to provide means for rapid calculation of the travel time $Tw$ through the weathered layer and the travel time $Te$ from the reference elevation to the base of the weathered layer. It is believed that the travel time from the shot points to the reference are so easily calculated that construction of apparatus for such calculation is not warranted; however, in view of this invention, it would be obvious to one skilled in the art that means could readily be designed to make this additional calculation.

The basic ideas presented in the foregoing illustrative calculations are incorporated into the apparatus to be hereinafter described, with certain modifications which will be apparent.

Figure 3:
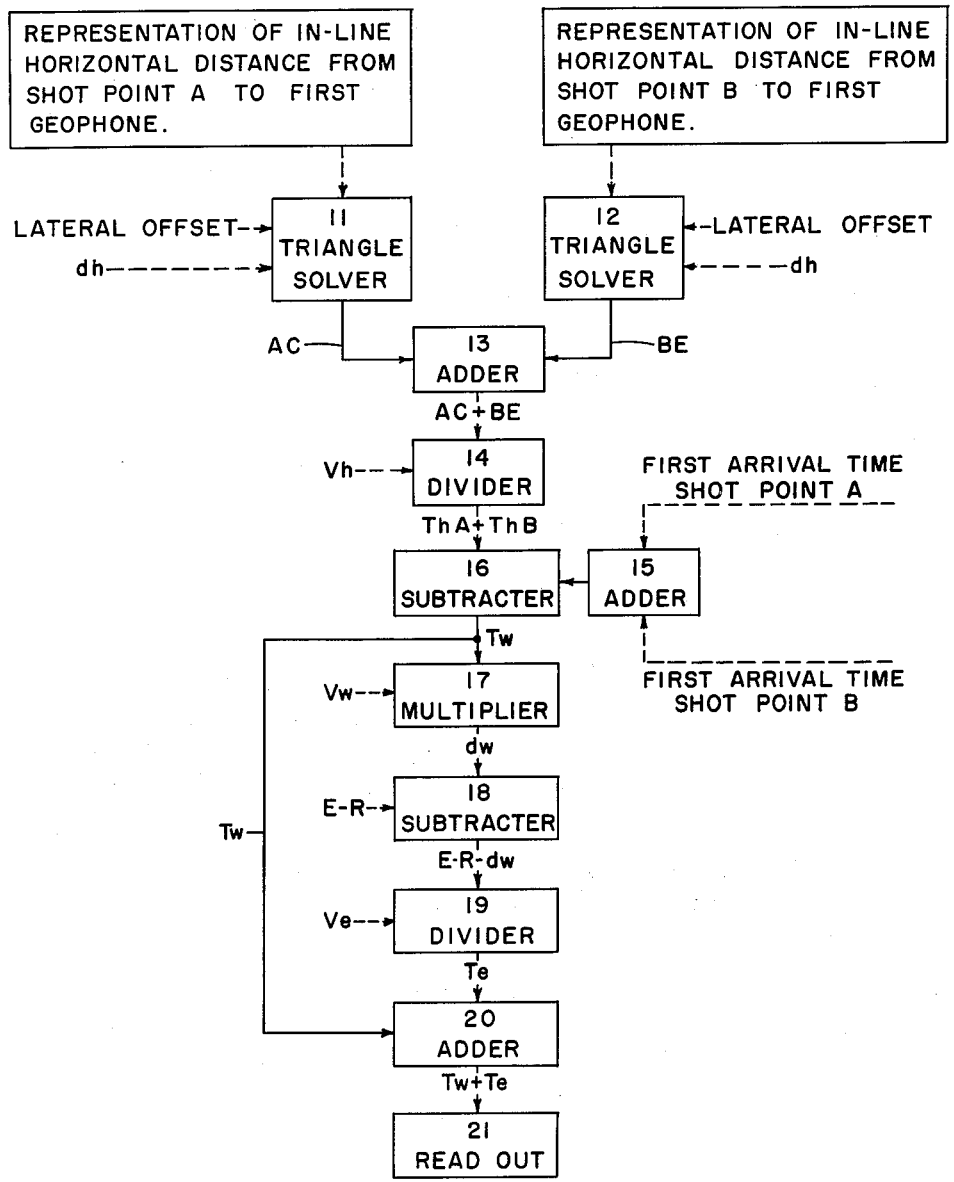
FIGURE 3 is a block diagram of one embodiment of the invention.

FIG. 3 illustrates the basic design of the apparatus. The in-line horizontal distances (the in-line components of GC and HE) from shot holes to the first geophone of each group may be determined by measurement, but it is more convenient to determine these distances automatically by means of a novel apparatus of FIG. 4 to be described later. Representations of these in-line horizontal distances, expressed in terms of shaft rotations proportional to such distances, are the inputs to the two triangle solvers 11 and 12. The triangle solvers 11 and 12 may each consist of two electromechanical resolvers (as described in U.S. Patent 2,742,604) arranged so that the first resolver of each triangle solver solves the triangle formed by the in-line horizontal distance and the lateral offset, and so that the second resolver solves the triangle formed by the output of the first resolver and the vertical distance ($dh$) from base of weathered layer to the explosive charge. The triangle solvers 11 and 12 may also consist of bridge circuits as shown in "Electronic Instruments" by Greenwood, Holdam, and Macrae, McGraw-Hill Book Company, Inc., 1948, figure 6.7, page 139; or such triangle solvers may consist of any system capable of converting representations proportional to given rectangular co-ordinates into representations proportional to the vector sums of the given rectangular co-ordinates. In place of these triangle solvers (requiring 2 resolvers each), we prefer to use a novel device illustrated in FIG. 6, with which the two triangles may be solved simultaneously. Thus each triangle solver will preferably comprise a device as illustrated in FIG. 6, which will be explained later.

The outputs of the triangle solvers 11 and 12 will thus be representative of the distances from shot points A and B, respectively, to the points C and E, directly beneath the nearest geophones D and F of the geophone group under observation. The outputs of the triangle solvers are available in terms of shaft rotation, if bridge circuits as shown in the reference cited above or devices as shown in FIG. 6 are employed as triangle solvers. If electromechanical resolvers are used as triangle solvers, then the outputs of the triangle solvers 11 and 12 will be expressed in terms of voltages.

The outputs of the triangle solvers are then added by means of adder 13 to give the sum of the distances AC and BE. If the outputs of triangle solvers 11 and 12 are expressed in terms of shaft rotation, the adder 13 will most conveniently comprise a mechanical differential adder, but might comprise a set of synchros (illustrated in "Electronic Instruments," supra, section 3.5). If the outputs of triangle solvers 11 and 12 are voltages, the adder 13 would most conveniently comprise a parallel impedance network ("Electronic Instruments," supra, section 3.5).

The output of adder 13 (distance AC plus BE) is then divided by a representation of the refracting velocity $Vh$ to give a resultant shaft rotation representative of the sum of the two travel times ($ThA+ThB$) from A to C and from B to E. Divider 14 may consist of any convenient means for performing the division of two quantities. Suitable dividers include: wholly mechanical linkage multipliers such as a ball and disc integrator; mechanically controlled voltage dividers such as potentiometers or synchro-type resolvers ("Electronic Instruments," supra, section 3.11); and bridge circuits.

Representations of the first arrival times from shot holes A and B (the travel times from A to D and from B to F), preferably expressed in terms of shaft rotations, are added in adder 15, which may comprise any convenient means for adding (preferably a mechanical differential adder). The output of divider 14 is subtracted from the output of adder 15 in subtracter 16, which is designed to perform the subtraction and divide the result by two, thus giving an output representative of the travel time ($Tw$) through the weathered layer at the center of the geophone group under observation. Subtracter 16 is preferably of the mechanical differential type, but may comprise any convenient means for performing the subtraction and dividing the result by two. It is inherent in the nature of a mechanical differential subtracter that the result will be divided by two.

The first arrival times are determined by any convenient means well know in the art, preferably by taking their values from a record of the seismic traces obtained in the forward and reverse profiles determined by detonation at A and B. The time of travel ($Tw$) through the weathered layer, from subtracter 16, is multiplied by a representation of the velocity ($Vw$) in the weathered layer, in multiplier 17, to give a product representative of the thickness ($dw$) of the weathered layer at any geophone group position. Multiplier 17 may be of any suitable type similar to the dividers enumerated above in the description of divider 14.

In subtracter 18 $dw$ is subtracted from the known distance (E—R) of the geophone group above the reference elevation to give E—R—$dw$, which is the vertical distance from the reference elevation to the base of the weathered layer. If a mechanical differential subtracter is used, the output of 18 will actually be half of E—R—$dw$, and it will be desired to double said output by any convenient gear arrangement (not shown). The output of subtracter 18 is then divided by a representation of the vertical velocity ($Ve$) below the weathered layer, in divider 19, to give the time of travel ($Te$) from the reference to the base of the weathered layer.

$Tw$ and $Te$ may then be added in adder 20 and introduced to read out device 21. The direct connection from the subtracter 16 to adder 20, bypassing the multiplier 17, subtracter 18, and divider 19 will be either mechanical or electrical, depending on whether the output of subtracter 16 is mechanical rotation or electrical energy. The resulting values of $Tw$ and $Te$ are the desired time corrections to be applied to the virgin seismic data.

As indicated above, FIG. 4 is a diagram of a novel apparatus designed to produce shaft rotation representations of the in-line horizontal distances (in-line components of GC and HE). Shafts are shown as dotted lines in FIG. 4.

In operation, continuously rotating motor 22 causes the input member of clutch 31 to rotate continuously. The output member of clutch 31 is controlled by coil 30, and is engaged only when coil 30 is energized. Switch 26 is controlled by cam 23 by means of actuating member 27. When switch 26 is in the normally open (or standby) position (as shown in FIG. 4), coil 30 is not energized and pilot lamp 28 is glowing. When it is desired to produce representations of in-line horizontal distances for the first geophone group 1, the operator, at any time when the pilot lamp 28 is glowing, closes switch 29, thereby energizing coil 30 and thus engaging clutch 31 and imparting rotational motion to cam 23 by means of shaft 32 and variable-ratio drive 24 (herein shown as a ball-and-disc integrator, but consisting of any suitable variable-ratio drive). As cam 23 rotates it moves actuating member 27, thereby changing the position of switch 26 to the normally closed (or metering) position, at which time pilot lamp 28 is extinguished, thereby signalling the operator to open switch 29. When the operator opens switch 29, coil 30 nevertheless remains energized through switch 26, until cam 23 rotates through its designed fixed angular displacement, at which time actuating member 27 is engaged in the recess of cam 31, thereby returning switch 26 to its normally open (or standby) position. Upon return of switch 26 to its normally open (or standby) position, pilot lamp 28 is again energized, and clutch 31 is disengaged by the de-energization of coil 30.

Cam 23 is rotated through its fixed angular displacement in the metering cycle by means of shaft 32. Shaft 32 also causes shaft 33, and thereby shafts 34A and 34B, to rotate; but it is necessary that shafts 34A and 34B rotate through an angular displacement proportional to the spread length. The spread length will be different for every different pair of shot holes, hence there must be a functional relationship between the fixed angular displacement of cam 23 and the variable angular displacement of shaft 32. This functional relationship is obtained by means of variable ratio drive 24, whose ratio is calibrated in terms of spread length by means of dial 25. Thus, each time switch 29 is actuated cam 23 goes through one metering cycle and shafts 34A and 34B rotate an amount proportional to the spread length. Such rotation is imparted to potentiometers 35A and 35B through shafts 34A and 34B. Potentiometers 35A and 35B each represent one of the potentiometer elements of the triangle solver illustrated in FIG. 6 and relate to shot points A and B, respectively.

In order to assure that the rotation of shafts 34A and 34B represent the true in-line horizontal distances from A to C and from B to E allowance must be made for the in-line offset (illustrated in FIG. 2), if any, and for ½ of the geophone group length. The correction for the geophone group length is necessary because the first arrival time is based upon data received from the geophones nearest the shot points rather than from the center of the geophone group. Allowance for the in-line offsets are made through dials 37 and 38. Allowance for the geophone group length is made through dial 39. In operation shaft 32 is indexed to the first position, representing the first geophone group 1. Then with clutches 40 and 41 disengaged, the corrections for in-line offset and geophone group length are made. Then clutches 40 and 41 are engaged and clutches 42, 43, 44, and 45 are disengaged. After the necessary corrections have been made, the rotation of shafts 34A and 34B will be respectively proportional to, and representative of, the in-line horizontal distances from shot points A and B, to the nearest geophone in the nearest geophone group. Each time the switch 29 is closed, an additional amount of rotation proportional to the spread length, and therefore proportional to the distance between geophone groups, is imparted to the shafts of potentiometers 35A and 35B. Thus the cumulative input to potentiometers 35A and 35B will be determined by the number of times the switch 29 has been actuated, and will be proportional to the in-line horizontal distances from the shot point to the geophone group corresponding to the number of actuations of said switch.

Potentiometers 35A and 35B are arranged so that when one is in the position of minimum or zero distance displacement, the other is in a position representing the total spread length. Accordingly, as the rotation input to potentiometer 35A is increased to correspond to the in-line horizontal distance from shot point A to any geophone group, the input to potentiometer 35B will be decreased to correspond to the in-line horizontal distance from shot hole B to the same geophone group. These representations of in-line horizontal distances are the inputs to triangle solvers 11 and 12, previously discussed.

FIG. 6 is a diagrammatic representation of a novel device which may be used as one or both of the triangle solvers 11 and 12. The device consists of a bridge circuit comprising input arm JK, output arm JM, ratio arms KL and LM for scale adjustment, a voltage source V, a servo amplifier 52, and a motor 53.

The components 35, 46, and 47 are potentiometers having impedance elements which vary with linear relation to the displacements imparted to them by rotation of input shafts 34, 49, and 50, respectively, and having additional fixed impedance elements equal to the maximum impedance of the corresponding variable impedances, and connected as shown in FIG. 6. The impedance of each potentiometer will therefore be a function of the square of the displacement imparted to the variable element by the shaft rotation inputs. The total impedance of arm JK will therefore be a function of the sum of the squares of the input displacements. When the bridge is balanced the total impedance of arm JM will be equal to the total impedance of arm JK so that the resultant impedance of potentiometer 51 will be a function of the sum of the squares of the input displacements, and hence the rotation output of shaft S will be a function of the square root of the sum of the squares of the input rotations of 34, 49, and 50. The bridge may be balanced automatically by means of servo amplifier 52 and motor 53.

Scale adjustments may be performed by means of impedance elements 54 and 55, and the initial zero balance is obtained by adjustment of impedance element 56.

It is apparent that the bridge circuit of FIG. 6 may be used to solve two right triangles simultaneously. Accordingly, representations of in-line horizontal distance (Ho), vertical distance (dh) from base of the weathered layer to the explosive charge, and lateral offset, expressed in terms of rotations of shafts 34, 49, and 50, respectively, are introduced to potentiometers 35, 46, and 47. The output rotation of shaft S is therefore representative of the distance (AC or BE of FIG. 1) from the shot point to the point at the base of the weathered layer directly beneath the nearest geophone of the respective geophone group.

If bridge circuits (FIG. 6) are used for both of the triangle solvers 11 and 12, the output rotations representative of the distances AC and BE, respectively, of FIG. 1, are the input rotations to adder 13.

Obviously many modifications and variations of the present invention are possible in the light of the foregoing description. It is therefore to be understood that within the scope of the appended claims the invention may be practiced otherwise than as specifically described. This is particularly true with respect to the types of multipliers, dividers, adders, and subtractors to be used in the construction of the apparatus.

Having thus described our invention we claim:

1. Apparatus for use in determining weathered layer and elevation corrections to be applied to seismic data comprising: first and second means each designed to determine the vector sum of two perpendicular vectors and to determine the vector sum of said first vector sum and a third vector perpendicular to said first vector sum; third means for adding the outputs of said first and second means; fourth means, operatively connected to said third means, for dividing the output of said third means by a representation of a known quantity; fifth means for adding representations of two known quantities; sixth means, operatively connected to said fourth means and said fifth means, for determining one-half the difference between the outputs of said fourth and said fifth means; seventh means, operatively connected to said sixth means, for multiplying the output of said sixth means by a representation of a known quantity; eighth means, operatively connected to said seventh means, for subtracting the output of said seventh means for a representation of a known quantity; and ninth means, operatively connected to said eighth means, for dividing the output of said eighth means by a known quantity.

2. Apparatus for use in determining weathered layer and elevation corrections to be applied to seismic data comprising: first and second means each designed to determine the vector sum of two perpendicular vectors and to determine the vector sum of said first vector sum and a third vector perpendicular to said first vector sum; third means for adding the outputs of the said first and second means; fourth means, operatively connected to said third means, for dividing the output of said third means by a representation of a known quantity; fifth means for adding representations of two known quantities; sixth means, operatively connected to said fourth means and said fifth means, for determining one-half the difference between the outputs of said fourth and said fifth means; seventh means, operatively connected to said sixth means, for multiplying the output of said sixth means by a representation of a known quantity; eighth means, operatively connected to said seventh means, for subtracting the output of said seventh means from a representation of a known quantity; ninth means, operatively connected to said eighth means, for dividing the output of said eighth means by a known quantity; and tenth means, operatively connected to said sixth means and said ninth means, for adding the output of said sixth means to the output of said ninth means.

3. Apparatus for use in determining weathered layer and elevation corrections to be applied to seismic data comprising: first and second means, each designed to determine the vector sum of the in-line horizontal distance and the lateral offset and to determine the vector sum of said first vector sum and the vertical distance from the base of the weathered layer to the explosive charge; third means for adding the outputs of said first and second means; fourth means, operatively connected to said third means, for dividing the output of said third means by a representation of the refracting velocity; fifth means for adding representations of the first arrival times from the two shot points; sixth means, operatively connected to said fourth means and said fifth means, for determining one-half the difference between the outputs of said fourth and said fifth means; seventh means, operatively connected to said sixth means, for multiplying the output of said sixth means by a representation of the velocity through the weathered layer; eighth means, operatively connected to said seventh means, for subtracting the output of said seventh means from a representation of the vertical distance between the reference elevation and the geophone group; and ninth means, operatively connected to said eighth means, for dividing the output of said eighth means by a representation of the vertical velocity below the weathered layer.

4. Apparatus for use in determining weathered layer and elevation corrections to be applied to seismic data comprising: first and second means, each designed to determine the vector sum of the in-line horizontal distance and the lateral offset and to determine the vector sum of said first vector sum and the vertical distance from the base of the weathered layer to the explosive charge; third means for adding the outputs of said first and second means; fourth means, operatively connected to said third means, for dividing the output of said third means by a representation of the refracting velocity; fifth means for adding representations of the first arrival times from the two shot points; sixth means, operatively connected to said fourth means and said fifth means, for determining one-half the difference between the outputs of said fourth and said fifth means; seventh means, operatively connected to said sixth means, for multiplying the output of said sixth means by a representation of the velocity through the weathered layer; eighth means, operatively connected to said seventh means, for subtracting the output of said seventh means from a representation of the vertical distance between the reference elevation and the geophone group; ninth means, operatively connected to said eighth means, for dividing the output of said eighth means by a representation of the vertical velocity below the weathered layer; and tenth means, operatively connected to said sixth means and said ninth means, for adding the output of said sixth means to the output of said ninth means.

5. Apparatus for use in determining weathered layer and elevation corrections to be applied to seismic data comprising: first means for producing representations of in-line horizontal distances from each of two shot points to the first geophones of each of a plurality of geophone groups; second and third means, each designed to determine the vector sums of the in-line horizontal distances and the lateral offset and to determine the vector sums of said first vector sums and the vertical distances from the base of the weathered layer to explosive charge; fourth means for adding the outputs of said second and third means; fifth means, operatively connected to said fourth means, for dividing the outputs of said fourth means by a representation of the refracting velocity; sixth means for adding representations of the first arrival times from the two shot points; seventh means, operatively connected to said fifth means and said sixth means, for determining one-half the difference between the outputs of said fifth and said sixth means; eighth means, operatively connected to said seventh means, for multiplying the outputs of said seventh means by a representation of the velocity through the weathered layer; ninth means, operatively connected to said eighth means, for subtracting the outputs of said eighth means from representations of the vertical distances between the reference elevation and the respective geophone group; and tenth means, operatively connected to said ninth means, for dividing the outputs of said ninth means by a representation of the vertical velocity below the weathered layer.

6. Apparatus for use in determining weathered layer and elevation corrections to be applied to seismic data comprising: first means for producing representations of in-line horizontal distances from each of two shot points to the first geophones of each of the plurality of geophone groups; second and third means, each designed to determine the vector sums of the in-line horizontal distances and the lateral offset and to determine the vector sums of said first vector sums and the vertical distance from the base of the weathered layer to the explosive charge; fourth means for adding the outputs of said second and third means; fifth means, operatively connected to said fourth means, for dividing the output of said fourth means by a representation of the refracting velocity; sixth means for adding representations of the first arrival times from the two shot points; seventh means, operatively connected to said fifth means and said sixth means, for determining one-half the difference between the outputs of said fifth and said sixth means; eighth means, operatively connected to said seventh means, for multiplying the outputs of said seventh means by a representation of the velocity through the weathered layer; ninth means, operatively connected to said eighth means, for subtracting the output of said eighth means from representations of the vertical distances between the reference elevation and the respective geophone group; tenth means, operatively connected to said ninth means, for dividing the outputs of said ninth means by a representation of the vertical velocity below the weathered layer; and eleventh means, operatively connected to said seventh means and said tenth means, for adding the outputs of said seventh means to the outputs of said tenth means.

7. The apparatus of claim 5 further characterized in that said first means comprises: a motor; a magnetic clutch operatively connected to said motor; a source of current in series with the coil of said magnetic clutch; a first shaft operatively connected to the output member of the magnetic clutch; a second shaft operatively connected to said first shaft; a variable ratio drive operatively connected to said first shaft; a cam operatively connected to the output shaft of said variable ratio drive; a first switch, operatively connected to said cam, and connecting the source of current with the coil of the magnetic clutch when said first switch is in the closed position; a second switch, in parallel with said first switch with respect to the circuit formed by the coil of the magnetic clutch and the source of current; means for converting the rotation of said second shaft to third and fourth shaft rotations proportional to the rotation of said second shaft; and means for applying correction factors to each of said third and fourth shaft rotations to compensate for in-line offset and seis string length.

8. The apparatus of claim 6 further characterized in that said first means comprises: a motor; a magnetic clutch operatively connected to said motor; a source of current in series with the coil of said magnetic clutch; a first shaft operatively connected to the output member of the magnetic clutch; a second shaft operatively connected to said first shaft; a variable ratio drive operatively connected to said first shaft; a cam operatively connected to the output shaft of said variable ratio drive; a first switch, operatively connected to said cam, and connecting the source of current with the coil of the magnetic clutch when said first switch is in the closed position; a second switch, in parallel with said first switch with respect to the circuit formed by the coil of the magnetic clutch and the source of current; means for converting the rotation of said second shaft to third and fourth shaft rotations proportional to the rotation of said second shaft; and means for applying correction factors to each of said third and fourth shaft rotatoins to compensate for in-line offset and seis string length.

References Cited in the file of this patent

UNITED STATES PATENTS

| 2,829,828 | Hollenbach | Apr. 8, 1958 |
| 2,873,066 | McKenney | Feb. 10, 1959 |

OTHER REFERENCES

"Electronic Instruments" (Greenwood, Holdan, MacRae), published by McGraw-Hill, (New York) 1948. (Page 132 relied on.)

UNITED STATES PATENT OFFICE
CERTIFICATE OF CORRECTION

Patent No. 3,032,271                              May 1, 1962

Wayne B. Goodenow et al.

It is hereby certified that error appears in the above numbered patent requiring correction and that the said Letters Patent should read as corrected below.

Column 5, line 20, for "know" read -- known --; column 7, line 66, for "for" read -- from --; column 10, line 43, for "rotatoins" read -- rotations --.

Signed and sealed this 28th day of August 1962.

(SEAL)
Attest:

ESTON G. JOHNSON                                      DAVID L. LADD
Attesting Officer                                          Commissioner of Patents